Feb. 16, 1937. W. C. TROUT 2,071,009
MECHANICALLY OPERATED COUNTERBALANCE
Filed May 31, 1929
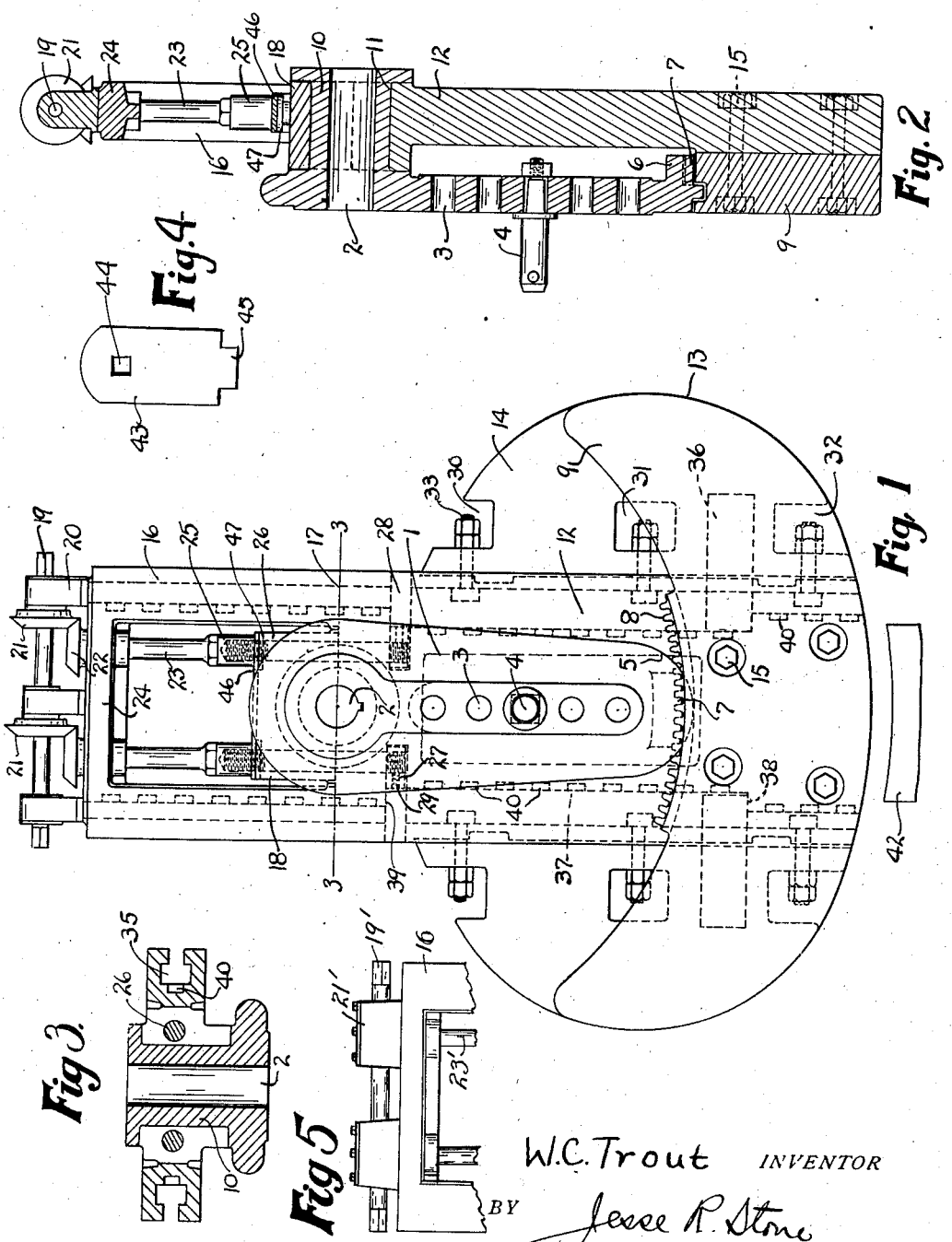
W.C. Trout INVENTOR
BY Jesse R. Stone
ATTORNEY Patented Feb. 16, 1937

2,071,009

UNITED STATES PATENT OFFICE 2,071,009

MECHANICALLY OPERATED COUNTER-BALANCE

Walter Charles Trout, Lufkin, Tex.

Application May 31, 1929, Serial No. 367,244

6 Claims. (Cl. 74—591)

My invention relates to counter-balances for use on a crank shaft employed in reciprocating loads as, for example, in the pumping of wells. It is particularly adapted for use on pumping equipment employed in deep wells for raising oil or water from the earth.

It is an object of the invention to provide a counter-balance which may be attached to the crank shaft of a standard pumping rig and arranged to counter-balance the weight of the rods, pump plunger and load of liquid above said plunger.

In ordinary pumping equipment it is common to operate from the crank shaft a walking beam or jack in which the pumping operation is performed and to also operate a hoisting device whereby the rods or tubing may be removed from the well for repair or replacement. It is necessary in counter-balancing the weight of the rods and the load thereon to employ a heavy weight, which sometimes may be in the neighborhood of a ton or more. Hence in employing the crank shaft for hoisting operations the counter-balance must be adjusted or removed from its connection with the crank shaft.

It is, therefore, an object of my invention to provide a counter-balance which may be easily adjusted relative to the crank shaft so as to be fixed thereon at any desired position on said shaft and released therefrom so that the shaft may be operated free of the counter-balance weight when desired.

I also desire to provide a counter-balance weight which may be adjusted upon the crank shaft into different positions relative to the crank arm to the forward or the rearward side thereof, as desired.

It is also an object to provide mechanically operated means whereby the turning of a gear will operate devices to connect or release the counter-balance from the shaft.

The invention further resides in the particular construction of the parts and their arrangement relative to each other, and these features of novelty will be more clearly understood from the description which follows.

Referring to the drawing herewith, Fig. 1 is a front elevation of a crank arm and my improved counter-balance arranged thereon.

Fig. 2 is a central longitudinal section thru the device shown in Fig. 1.

Fig. 3 is a transverse section on the plane 3—3 of Fig. 1.

Fig. 4 is a front elevation of a locking plate employed with my invention, said plate being slightly enlarged.

Fig. 5 is a side elevation of a modification of the gear mechanism.

In the drawing I have shown a crank arm 1 having an opening 2 therein to fit about the crank shaft and being adapted to be keyed to said shaft in the usual manner. The crank arm has a series of smaller openings 3 therein within which a wrist pin 4 may be fixed in any selected one of said openings. The lower end of the crank arm is rounded at 5 and on the inner side thereof is a lug 6, seen best in Fig. 2. On the lower side of this lug are a series of teeth 7 adapted to interfit with the teeth 8 upon a counter-balance weight 9.

The hub 10 of the crank arm 1 is extended inwardly and formed with a circumferential recess 11 therein to furnish a bearing support for an auxiliary plate or crank frame or arm 12. As seen in Fig. 1, the said frame 12 is a flat plate of greater width than the crank arm 1 and said frame is extended outwardly beyond the end of the crank arm a suitable distance so as to form a support below said crank arm for the counter-balance weight 9. Said weight 9 is of an arcuate shape having intermediate its ends a series of teeth 8, previously mentioned, on its upper side. The two ends 13 conform to the shape of the adjustable weights 14 which will be later noted. Said weight 9 is secured to the auxiliary arm or frame 12 by means of transverse bolts 15, which are extended thru the auxiliary arm and the weight and held in place by nuts. It will be seen that the auxiliary arm 12 and the weight 9 may be swung to different positions forwardly or rearwardly of the crank arm by disengaging the teeth 7 and 8 and moving said weight relative to the frame and engaging other teeth on the weight with the teeth 7 on the frame.

The mechanism for engaging and disengaging the teeth 8 comprises the frame 12, which, as seen in elevation in Fig. 1, extends above the crank shaft 2 and crank arm 1, as indicated at 16.

The upper end of the frame 16 furnishes a support for a transverse shaft 19 supported in posts 20 upon the frame. This shaft has either worm beveled gears 21 or 21' as seen in Figs. 1 and 5, respectively, which are adapted to engage with gears 22 upon upright shafts 23, which are in turn supported at their upper ends in the transverse member 24 of the frame.

The shafts 23 are slidable longitudinally thru the gears 22 but are splined thereto so as to be rotatable with said gears. The lower ends of these shafts 23 are each formed with a nutlike portion 25, which engages over the threaded upper end of a bolt 26. Said bolt extends longitudinally of the auxiliary arm 12 and has a nut 27 on its lower end below the crank shaft. Said nut is adapted to be inserted into the side of the auxiliary arm thru a recess 28 and fixed to the bolt by means of a set screw 29.

Fig. 5 shows a modification which is similar in construction to Fig. 1, except that worm gearing may be used as indicated at 21'. The advantage being that the worm gear will lock itself and prevent loosening of the bearing and also such gears may be lubricated readily. The shafts 19' and 23' are the same as the shafts 19 and 23 of Fig. 1.

The adjustable weights 14 are somewhat similar in construction to those shown in my prior Patent No. 1,588,784, granted June 15, 1926. They are approximately semi-circular shaped plates having recesses at 30, 31 and 32, to receive the ends of bolts 33, which extend from the weight laterally so that the heads of said bolts may engage in T-shaped slots or grooves shown best at 35 in Fig. 3. The bolts when loosened may be moved with the weight longitudinally of the arm 12 to different positions relative to the crank shaft so as to increase or decrease the counter-balancing effect thereof as desired. To prevent the movement of the said weights beyond a certain limited amount, I have provided keys, which may be seen at 36 in Fig. 1. These keys are flat plates fitting within recesses in the inner side of said weights and extending into the slot 35 on the inner side of the same.

It will be noted from Fig. 1 that the slot is deepened at 37 in the side of the arm 12 to receive these keys, thus providing a shoulder 38 at one end and a similar shoulder 39 at the other. Thus I provide a safety device which will prevent the weights from being thrown from the crank arm in case the bolts 33 become loosened so as to release the weights.

In moving the weights 14 longitudinally of the arm 12 I may provide notches or recesses 40 in the lower side of the grooves or slots 35 and 37. Thus when the weight 14 is to be moved to a different position on the arm 12, the shaft may be rotated to bring said arm in horizontal position. The nuts may be then loosened from the bolts 33 so as to allow the weights 14 to slide and a pinch bar may be inserted into the slot 35 to engage within one of the recesses 40. The bar thus obtains a fulcrum in the notch and enables the operator to move the weight along the arm into the desired position.

In the use of this device I contemplate the forming of a substantial support of concrete or similar material directly below the vertical position of the counter-balance. This support is indicated at 42 in Fig. 1. It has its upper face curved to conform to the curvature of the lower side of the weight and is adapted to support the weight when it is lowered thereon. The shaft 19 at the upper end of the yoke 16 is squared at its outer end and is adapted to be locked against rotation by means of a plate 43. The shape of this plate is shown in Fig. 4. It has a square opening 44 to receive the shaft 19 and its lower end is formed with a tongue 45 which is adapted to project into the upper end of the groove 35 in the portion 16 of the frame 12.

When it is desired to adjust the position of the weight to release it from the crank arm and crank shaft the locking plate 43 is first removed from the shaft 19 and an ordinary crank is employed to rotate said shaft 19 in the proper direction to unscrew the shafts 23 from the bolts 26. A locking plate 46 is fixed above a lower flange 47 on the nuts 25 so as to form a swivel connection between the said nuts 25 and the bearing 18. As the nuts 25 are unscrewed from the bolts 26 the weights 9 and 14 and the frame 12 are gradually allowed to drop away from the crank arm and thus to allow the weight to be idle. In this manner the parts 10 and 11 of Fig. 2 separate. When the weights have settled upon the support 42 the continued rotation of the shaft 23 will cause the upper or cap section 18 of the bearing to move away from the hub 10 of the crank arm; and the crank shaft may be thereafter rotated without moving the frame 12. It will be seen that as the weight end of the frame is dropped the shafts 23 will project upwardly thru the gears 22 thereon but after the weights have settled upon the support further rotation will act to raise the cap 18 upwardly away from the crank shaft and arm until the two parts 11 and 18 are free of the hub 10. Thereafter the crank shaft and the crank arm thereon may be rotated unaffected by the presence of the counter-balance weight.

The advantages of my construction lie in the ease with which the heavy counter-balance weight may be connected or disconnected from the crank shaft. When it is desired to use the crank shaft for hoisting, the counter-balancing weight may be released from the crank shaft by the simple rotation of the shaft 19, thus acting to disengage the frame and bearing from the shaft as just described.

Another advantage lies in the manner in which the weight 9 may be set forwardly or rearwardly of the normal counter-balancing position shown in Fig. 1. This is to enable the operator to get the effect of the counter-balance to overcome resistance due to friction of the pump rods in the tubing or thru lost motion, due to the stretching of the rods or otherwise, and obtain the effect of the counter-balance at the exact position in the stroke of the pump, which is found necessary by experiment. The weights 14 are adjustable to increase or decrease the effect of the weight at all times and this feature previously shown in my prior patent above referred to assists in the proper adjustment of the weight on the rods in the usual manner.

What I claim as new is:

1. In combination with a crank arm, an auxiliary arm adjacent thereto, weights on said auxiliary arm, and means on one of said weights engaging said crank arm to prevent rotative movement of one relative to the other.

2. In combination with a crank arm, a hub thereon, an auxiliary arm having a bearing on said hub, weights on said auxiliary arm, and means on one of said weights engaging said crank arm to prevent rotative movement of one relative to the other.

3. In combination with a crank arm, an auxiliary arm adjacent thereto, weights on said auxiliary arm, and interengaging teeth on said arm and one of said weights, means on one of said weights engaging said crank arm to prevent rotative movement of one relative to the other.

4. In combination with a crank arm, a hub thereon, an auxiliary arm having a bearing on said hub, weights on said auxiliary arm, means on one of said weights engaging said crank arm to prevent rotative movement of one relative t the other, and means to release said auxiliary arm from said hub and said crank arm.

5. A crank arm having a hub thereon, an auxiliary arm journaled for swinging upon said hub, teeth on the end of said crank arm, a weight on said auxiliary arm, a plurality of teeth on said weight engaging the teeth on said crank arm and means to release said teeth from engagement with each other and remove said auxiliary arm from connection with said hub.

6. A crank arm having a hub thereon, an auxiliary arm journaled for swinging upon said hub, teeth on the end of said crank arm, a weight on said auxiliary arm, a plurality of teeth on said weight engaging the teeth on said crank arm and means to move said weight radially away from engagement with said arm and to entirely disconnect said auxiliary arm from said crank arm.

WALTER CHARLES TROUT.